United States Patent
Bernstein et al.

[15] 3,668,198

[45] June 6, 1972

[54] α-UREIDO-2,4,6-CYCLOHEP-TATRIENYLMETHYLPENICILLINS

[72] Inventors: Jack Bernstein, New Brunswick; Patrick Andrew Diassi, Westfield; Frank Lee Weisenborn, Somerset, all of N.J.

[73] Assignee: E. R. Squibb & Sons, Inc., New York, N.Y.

[22] Filed: June 1, 1970

[21] Appl. No.: 42,600

[52] U.S. Cl. ........................260/239.1, 424/271, 260/514 R
[51] Int. Cl. .....................................C07d 99/16, C07d 99/24
[58] Field of Search..............................................260/239.1

[56] References Cited

UNITED STATES PATENTS 3,531,470  9/1970  Diassi et al..........................260/239.1

FOREIGN PATENTS OR APPLICATIONS 746,904  11/1966  Canada...............................260/239.1

*Primary Examiner*—Nicholas S. Rizzo
*Attorney*—Lawrence S. Levinson, Merle J. Smith, Donald J. Perrella and Burton Rodney

[57] ABSTRACT

This invention relates to α-ureido-2,4,6-cycloheptatrienyl-methylpenicillins as well as their salts, which are useful as antibacterial agents.

12 Claims, No Drawings

α-UREIDO-2,4,6-CYCLOHEPTATRIENYLMETHYLPENICILLINS

SUMMARY OF THE INVENTION

This invention relates to α-ureido-2,4,6-cycloheptatrienylmethylpenicillins of the formula

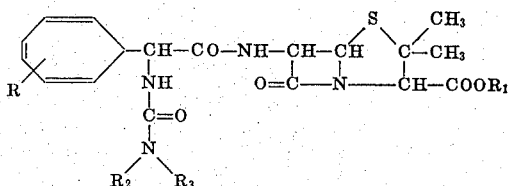

wherein R is hydrogen, halogen or lower alkyl; $R_1$ is hydrogen, lower alkyl or a salt forming ion, e.g., an alkali metal such as sodium or potassium, an alkaline earth metal such as calcium or magnesium or that of an organic base such as dibenzylamine, N, N-dibenzylethylenediamine or the like; $R_2$ is hydrogen or lower alkyl; $R_3$ is hydrogen, lower alkyl, aryl or $R_4CO$; and $R_4$ is lower alkyl, aryl or substituted aryl; and salts thereof.

In formula I, all four halogens are included by the symbol R, but chlorine and bromine are preferred. The lower alkyl groups represented by R and $R_1$ are straight and branched chain aliphatic hydrocarbon radicals of up to seven carbon atoms, such as methyl, ethyl, propyl, isopropyl, butyl, isobutyl, t-butyl and the like. The aryl and substituted aryl groups represented by $R_3$ and $R_4$ are monocyclic or bicyclic aromatic groups, e.g., R-phenyl and R-naphthyl like phenyl, naphthyl, o-, m- or p-chlorophenyl, chloronaphthyl, o-, m- or p-tolyl, and the like.

DETAILED DESCRIPTION OF THE INVENTION

The new compounds of formula I may be prepared by coupling either an activated form of the α-ureido-2,4,6-cycloheptatrieneacetic acid of the formula

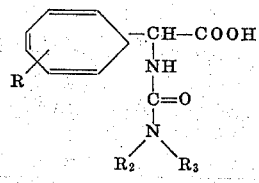

or an activated form of the α-amino-2,4,6-cycloheptatrieneacetic acid [2-(2,4,6-cycloheptatrien-1-yl)glycine] having the formula

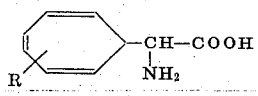

with 6-aminopenicillanic acid (6-APA) having the formula

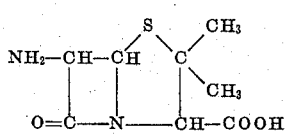

or a salt thereof.

When the intermediate of formula III is used, the products of formula I are obtained by treating the product of the coupling reaction, after removal of the amine protecting group, with a metal cyanate, an alkyl or aryl isocyanate, an acyl isocyanate, dialkyl carbamoyl halide or carbamyl phosphate.

The amino group of the compound of formula III is best protected before coupling for an efficient process. Protecting groups which may be used to protect the amino group during the reaction of the acid compound with 6-APA include, for example, triphenylmethyl, t-butoxycarbonyl, β,β,β-trichloroethoxycarbonyl, 4-oxo-2-pentenyl-2, 1-carbomethoxy-1-propenyl-2 or the like. These are formed by reacting the acid of formula III with a compound such as triphenylmethyl chloride, t-butyl azidoformate, β,β,β-trichloroethyl chloroformate, acetylacetone, methyl aceto acetate or the like. After the coupling reaction, the protecting group is removed, e.g., by treatment with aqueous acetic acid, trifluoroacetic acid, zinc-acetic acid, or aqueous mineral acid, respectively to give the compound with the free amino group.

Alternately the amino group may be protected by protonation as the salt form before and during the subsequent coupling reaction.

The compound of formula IV may also be in the form of derivatives like aldimines or Schiff's bases formed with the amino group. Such derivatives are frequently useful as starting materials or intermediates by virtue of their stability and, in many cases, increased yields and more uniform reaction.

The coupling is preferably effected by conversion of the acid of formula III to an activated form such as the acid chloride, azide, p-nitrophenyl ester or mixed anhydride, or by condensing in the presence of a carbodiimide such as dicyclohexylcarbodiimide.

The starting materials of formula III may be prepared by the condensation of a tropylium tetrafluoroborate with dimethyl formamidomalonate or dimethyl acetamidomalonate. In those cases in which a substituted tropylium tetrafluoroborate is used, the resultant product usually consists of a mixture of 2,3 and 4-substituted-2,4,6-cycloheptatrien-1-yl derivatives. This mixture of isomers may be separated after this first reaction, at any subsequent step in the synthesis or the mixture of isomers obtained in the final step may be used as such.

The malonic ester is hydrolyzed to the α-aminocycloheptatrien-1-yl acetic acid. Suitable tropylium tetrafluoroborates for this condensation include, among others, tropylium tetrafluoroborate, chlorotropylium tetrafluoroborate, bromotropylium tetrafluoroborate and methyltropylium tetrafluoroborate. Other tropylium tetrafluoroborates are readily prepared from the corresponding substituted tropilidenes, such as isopropyl tropilidene, by a hydride exchange reaction with trityl salts in solvents such as acetonitrile or sulfur dioxide.

The intermediate of formula II may then be formed from the compound of formula III by treating with a cyanate, e.g., an alkali metal cyanate, with carbamyl phosphate, an alkyl or aryl isocyanate, a dialkylcarbamoyl halide or an acyl isocyanate. This is effected by dissolving or suspending the compound of formula III in aqueous medium and the cyanate or carbamyl phosphate is slowly added. Heat, e.g., up to about 80° C., may be applied to accelerate the reaction. The pH of the reaction mixture is preferably maintained in the acid range, e.g., about 5 to 6.9. The product may usually be precipitated by acidification and chilling. It may also be used directly, without purification, in the next step.

When reagents other than the metal cyanates or carbamyl phosphate are used, e.g., alkyl or aryl isocyanates, dialkylcarbamoyl halides or an acyl isocyanate the reaction is carried out in an inert solvent under anhydrous conditions.

When a compound of formula III (or its protected form) is coupled with 6-APA, the resulting product, after removal of the protecting group, is treated with a cyanate, carbamyl phosphate, an alkyl or aryl isocyanate, a dialkylcarbamoyl halide, or an acyl isocyanate in the same manner as described above.

The products of this invention form salts which are also part of the invention. Basic salts form with the acid moiety as discussed above in connection with the symbol $R_1$. Acid addition salts also form with the α-amino nitrogen. Such acid salts include, for example, inorganic salts such as the hydrohalides, e.g., hydrobromide, hydrochloride, hydroiodide, sulfate, nitrate, phosphate, borate, etc., and organic salts such as acetate, oxalate, tartrate, malate, citrate, succinate, benzoate, ascorbate, methanesulfonate and the like. It is frequently convenient to isolate and purify the product by forming a soluble or insoluble salt, as desired, then regenerating the free compound, by neutralization, for example.

The preferred compound within the group described by formula I is that in which R, $R_1$, $R_2$ and $R_3$ are all hydrogen.

It will be appreciated that certain of the compounds of this invention exist in different optically active forms. The various stereoisomeric forms are within the scope of this invention.

The compounds of this invention have a broad spectrum of antibacterial activity against both gram positive and gram negative organisms such as *Staphylococcus aureus*, *Salmonella schottmuelleri*, *Pseudomonas aëruginosa*, *Proteus vulgaris*, *Escherichia coli* and *Streptococcus pyogenes*. They may be used as antibacterial agents in a prophylactic manner, e.g., in cleaning or disinfecting compositions, e.g., in aqueous solutions or in inert solid carriers at concentrations of about 0.01 to 1 percent by weight, or otherwise to combat infections due to organisms such as those named above, and in general may be utilized in a manner similar to penicillin G and other penicillins. For example, a compound of formula I or a physiologically acceptable salt thereof may be used in various animal species, such as mice, rats, dogs, etc., in an amount of about 0.1 to 100 mg/kg/day, orally or parenterally, in single or 2 to 4 divided doses to treat infections of bacterial origin.

The products of this invention are particularly effective against hard to control species of Pseudomonas, preferably administered subcutaneously. Up to about 600 mg. of a compound of formula I or a salt thereof may be incorporated in an oral dosage form such as tablets, capsules or elixirs or in an injectable form in a sterile aqueous vehicle prepared according to conventional pharmaceutical practice. In cleaning or disinfecting compositions, e.g., in barns or dairy equipment, a concentration of about 0.01 to 1 percent by weight of such compounds admixed with, suspended or dissolved in conventional inert dry or aqueous carriers for application by washing or spraying may be used.

The following examples are illustrative of the invention. All temperatures are on the centigrade scale.

GENERAL PROCEDURE

1. Methyl acetoacetate enamine of the 2-(2,4,6-cycloheptatrien-1-yl)glycine sodium salt 2.00 mmoles of the 2-(2,4,6-cycloheptatrien-1-yl) glycine are dissolved by warming in a solution of 108 mg. of $NaOCH_3$ (2.00 mmoles) in 4.3 ml. reagent grade MeOH. 255 mg. (0.24 ml. - 2.20 mmoles) methyl aceto acetate is added and the mixture refluxed for 45 minutes. The MeOH is almost totally stripped off in vacuo. 5 ml. benzene is added and distilled off to a small residual volume. The addition and distillation of benzene is repeated to insure complete removal of the MeOH and water. The product crystallizes out overnight from a small residual volume of benzene; the amorphous powder obtained from benzene is quite satisfactory for further use.

2. α-Amino-α-(2,4,6-cycloheptatrien-1-yl)methylpenicillin 358 mg. 6-aminopenicillanic acid (1.66 mmoles) are stirred well in 2.5 ml. water while 0.23 ml. triethylamine are gradually added with the pH kept under 8.0. Final pH is 7.4; 0.85 ml. acetone are added and the solution kept at —10° C.

The methyl acetoacetate enamine of the 2-(2,4,6-cycloheptatrien-1-yl)glycine sodium salt (1.715 mmoles) is stirred in 4.25 ml. acetone at —20° C. A microdrop of N-methylmorpholine is added followed by the slow addition of 198 mg. of ice cold ethyl chloroformate. Water, 0.43 ml., is added at this point and a turbid solution results. The reaction is stirred for 10 minutes at —20° C.

The turbid solution of mixed anhydride is then added to 6-aminopenicillanic acid. A complete solution is observed. The solution is stirred for 30 minutes at —10° C. It is then raised to room temperature and acidified to pH 2.0 with diluted HCl and, with good stirring, the pH is kept at that level for 10 minutes.

The solution is then extracted with 5 ml. xylene. The aqueous layer is layered with 5 ml. methyl isobutyl ketone and the pH adjusted to 5.0 with 1 N NaOH and chilled overnight. The resulting crystals are filtered off, washed with water, and air dried; alternatively, the aqueous layer may be lyophilized, and the product obtained as a mixture with salt may be used directly or purified by crystallization from aqueous alcohol.

3. α-Ureido-α-(2,4,6-cycloheptatrien-1-yl)methylpenicillin

A suspension containing 300 mg. of the product of part 2 in about 7 to 10 ml. of water is prepared. To this suspension there is added 600 mg. of potassium cyanate with vigorous stirring. The reaction mixture is kept for about 5 hours at about 22°–25° C. and the pH is maintained between 5.0 and 6.9 by the addition of 6N hydrochloric acid. The solution is chilled and acidified to pH 1.9 – 2.0 with 2N hydrochloric acid. The product which precipitates is filtered, washed with cold water and dried.

3. alternate α-Substitutedureido-α(2,4,6-cycloheptatrien-1-yl)-methylpenicillin

A well stirred suspension of 300 mg. of the product in part 2 in an anhydrous inert solvent such as dimethylsulfoxide, acetone, dimethylformamide, chloroform, methylene chloride or tetrahydrofuran is treated with an isocyanate at a temperature in the range of —20° to 50°, preferably 0°–25° C. for at least 30 minutes. The organic solvent is partially removed under reduced pressure and water added to the residue. The mixture is acidified with phosphoric acid and then extracted several times with ethyl acetate. The combined extracts are washed with water, dried and treated with a solution of sodium or potassium 2-ethylhexanoate in n-butanol. The precipitated product is collected and washed with ethyl acetate, yielding a sodium or potassium salt of the desired penicillin. An aqueous solution of this salt is treated with an ion-exchange resin such as Dowex 50 or IR200 in the acid form, and the solution lyophylized to yield the desired penicillin as the free acid.

EXAMPLE 1 a. Methyl acetoacetic ester enamine of 2-(2,4,6-cycloheptatrien-1-yl)glycine, sodium salt 330 mg. 2-(2,4,6-cycloheptatrien-yl)glycine (2.00 mmoles) are dissolved by warming in a solution of 108 mg. of $NaOCH_3$ (2.00 mmoles) in 4.3 ml. reagent grade MeOH. 255 mg. (0.24 ml.–2.20 mmoles) methyl acetoacetate are added and the mixture refluxed for 45 minutes. The MeOH is almost totally stripped off in vacuo. 5 ml. benzene are added and distilled off to a small residual volume. The addition and distillation of benzene is repeated to insure complete removal of the MeOH and water. The product crystallizes out overnight from a small residual column of benzene. It is filtered off, washed with benzene, and dried in vacuo.

b. α-Amino-(2,4,6-cycloheptatrien-1-yl)methylpenicillin 358 mg. of 6-aminopenicillanic acid (1.66 mmoles) are stirred well in 2.5 ml. of water while 0.23 ml. triethylamine are gradually added with the pH kept under 8.0. Final pH is 7.4; 0.85 ml. acetone are added and the solution kept at —10° C.

489 mg. methyl acetoacetate enamine of 2-(2,4,6-cycloheptatrien-yl)glycine sodium salt (1.715 mmoles) are stirred in 4.25 ml. acetone at —20° C. A microdrop of N-methylmorpholine is added followed by the slow addition of 198 mg. of ice cold ethyl chloroformate. Water, 0.43 ml., is added at this point and a turbid solution results. The reaction mixture is stirred for 10 minutes at —20° C.

The turbid solution of mixed anhydride is then added to the 6-APA solution. A complete solution is observed. The solution is stirred for 30 minutes at —10° C., then raised to room temperature, acidified to pH 2.0 with dilute HCl and, with good stirring, the pH is kept at that level for 10 minutes.

The solution is then extracted with 5 ml. xylene. The aqueous layer is layered with 5 ml. methyl isobutyl ketone and the pH adjusted to 5.0 with 1 N NaOH and chilled overnight. The resulting crystals are filtered off, washed with water and air dried.

c. α-Ureido-(2,4,6-cycloheptatrien-1-yl)methylpenicillin

To a suspension of 300 mg. of α-amino-(2,4,6-cycloheptatrien-1-yl)methylpenicillin in 7.0 ml. of water, there is added 600 mg. of potassium cyanate with vigorous stirring. The reaction mixture is maintained at 22°–24° C. and the pH maintained between 5.0 and 6.9 by the addition of 6N hydrochloric acid. After 5 hours, the reaction mixture is cooled in an ice-bath and acidified to pH of about 2 by the addition of 2N hydrochloric acid. The precipitated solid is filtered, washed with cold water and dried under reduced pressure to yield the desired α-ureido-(2,4,6-cycloheptatrien-1-yl)methylpenicillin.

EXAMPLE 2 a. Dimethyl α-formamido-(4-methyl-2,4,6-cycloheptatriene)-1-malonate

A solution of 2.3 grams of sodium in 60 ml. of absolute ethanol is added dropwise and with stirring to a finely powdered mixture of 17.5 grams dimethyl formamidomalonate and 19 grams of methyltropylium tetrafluoroborate. To this there is then added 150 ml. of water and the solution is extracted with methylene chloride. The methylene chloride extracts are combined, dried over anhydrous sodium sulfate and then concentrated to yield the desired product.

b. N-Formyl-2-(4-methyl-2,4,6-cycloheptatrien-1-yl)glycine

A solution of 2.77 grams of dimethyl α-formamido-methyl-2,4,6-cycloheptatrien-1-malonate in 60 ml. of methyl alcohol containing 8 grams of sodium hydroxide is allowed to stir overnight at room temperature. The reaction mixture is then concentrated to dryness under reduced pressure and the residue is dissolved in water. The pH of the mixture is adjusted to 5 – 5.3 by the addition of Dowex-50 (acid form). The mixture is filtered and the filtrate is concentrated under reduced pressure to yield the desired product.

c. 2-(4-methyl-2,4,6-cycloheptatrien-1-yl)glycine

To a suspension of 3.1 grams of N-formyl-2-(4-methyl-2,4,6-cycloheptatrien-1-yl)glycine in 40 ml. of 3N hydrochloric acid there is added 25 ml. of dimethylformamide and 10 ml. of methanol. The mixture is heated until a clear solution is obtained, 1 ml. of concentrated hydrochloric acid is added and the solution is stirred overnight at room temperature. The solvent is removed by the addition of n-butanol and concentration under reduced pressure. The dark crystalline residue is dissolved in water and adsorbed in a Dowex-50 (acid form) column. The column is then eluted with 2N ammonium hydroxide solution and the elutes concentrated to dryness to yield the desired product. This may be further purified by suspension in aqueous methanol and filtration; the desired product being insoluble in this solvent mixture.

d. α-Amino-(4-methyl-2,4,6-cycloheptatrien-1-yl)methylpenicillin

Following the general procedure and using 2-(4-methyl-cycloheptatrien-1-yl)glycine as the starting acid, there is obtained the desired α-amino-(4-methyl-2,4,6-cycloheptatrien-1-yl)methylpenicillin.

e. α-Ureido-(4-methyl-2,4,6-cycloheptatrien-1-yl)methylpenicillin

Following the procedure of Example 1(c) but using α-amino-(4-methyl-2,4,6-cycloheptatrien-1-yl)methylpenicillin for an equivalent amount of α-amino-(2,4,6-cycloheptatrien-1-yl)methylpenicillin, there is obtained the desired α-ureido-(4-methyl-2,4,6-cycloheptatrien-1-yl)methylpenicillin.

EXAMPLE 3

α-Ureido-(3-chloro-2,4,6-cycloheptatrien-1-yl)methylpenicillin

Following the procedure of Example 2 but substituting an equivalent amount of chlorotropylium tetrafluoroborate for the methyltropylium tetrafluoroborate in part a, there is obtained the desired α-ureido-(3-chloro-2,4,6-cycloheptatrien-1-yl)methylpenicillin.

EXAMPLE 4

α-Ureido-(4-bromo-2,4,6-cycloheptatrien-1-yl)methylpenicillin

Following the procedure of Example 2 but substituting an equivalent amount of bromotropylium tetrafluoroborate for the methyltropylium tetrafluoroborate in part a, there is obtained the desired α-ureido-(4-bromo-2,4,6-cycloheptatrien-1-yl)methylpenicillin.

EXAMPLE 5

α-Ureido-(2,4,6-cycloheptatrien-1-yl)methylpenicillin, sodium salt

A solution of α-ureido-(2,4,6-cycloheptatrien-1-yl)methylpenicillin is obtained by dissolving the penicillin in an equivalent amount of aqueous 0.1 N sodium hydroxide. The solution is filtered and lyophilized to yield the desired α-ureido-(2,4,6-cycloheptatrien-1-yl)methylpenicillin, sodium salt.

EXAMPLE 6 a. 2-Ureido-2-(2,4,6-cycloheptatrien-1-yl)acetic acid

A suspension of 3.2 grams of 2-amino-2-(2,4,6-cycloheptatrien-1-yl)acetic acid in 25 ml. of water is treated with 2 grams of potassium cyanate and heated with vigorous stirring at about 75° until a clear solution is obtained. The cooled reaction mixture is acidified with dilute hydrochloric acid after 24 hours, the precipitated 2-ureido-2-(2,4,6-cycloheptatrien- 1-yl) acetic acid is collected by filtration, washed with water and dried in vacuo.

b. α-Ureido-(2,4,6-cycloheptatrien-1-yl)methylpenicillin

A suspension of 1.9 grams of α-ureido-(2,4,6-cycloheptatrien-1-yl)acetic acid in 50 ml. of dry acetone containing 1.5 ml. of triethylamine is cooled to −10° and treated with 0.9 ml. of ethyl chloroformate. The mixture is stirred at 0° for about 30 minutes and is then cooled to −20°. To this mixture there is added an ice-cold solution of the triethylamine salt of 6-aminopenicillanic acid (prepared from 2 grams of 6-aminopenicillanic acid, 1.3 ml. of triethylamine, and 40 ml. of 50 percent aqueous acetone. The mixture is stirred vigorously for 1 hour at 0° and is allowed to stir for an additional hour without cooling. The reaction mixture is diluted with ether and extracted several times with ether. The aqueous phase is acidified to pH 2 with dilute phosphoric acid and the resulting precipitate filtered, washed with water and air dried to yield the desired α-ureido-(2,4,6-cycloheptatrien-1-yl)methylpenicillin.

EXAMPLE 7 a. 2-(3,3-dimethylureido)-2-(2,4,6-cycloheptatrien-1-yl) acetic acid

To 1.65 grams of 2-amino-2-(2,4,6-cycloheptatrien-1-yl) acetic acid in 10 ml. of anhydrous pyridine, there is added dropwise, with vigorous stirring and cooling, a solution of 1.0 grams of dimethylcarbamoyl chloride in 3 ml. of anhydrous benzene. The reaction mixture is stirred for 1 hour after the addition is completed and is then concentrated partially, under reduced pressure to remove the benzene. The residue is poured onto crushed ice, and acidified with dilute hydrochloric acid. The precipitated solid is filtered, washed with water and air dried to yield the desired 2-(3,3-dimethylureido)-2-(2,4,6-cycloheptatrienyl) acetic acid.

b. [(3,3-Dimethylureido)-(2,4,6-cycloheptatrien-1-yl)-methyl]penicillin

Following the procedure of Example 6 (b) but substituting 2-(3,3-dimethylureido)-2-(2,4,6-cycloheptatrien-1-yl) acetic acid for an equivalent amount of the 2-ureido-2-(2,4,6-cycloheptatrien-1-yl)acetic acid there is obtained the desired [(3,3-dimethylureido-(2,4,6-cycloheptatrien-1-yl)methyl]penicillin.

EXAMPLE 8

[(3-n-Butylureido)-(2,4,6-cycloheptatrien-1-yl)methyl]penicillin

To a mixture of 2.3 grams of [α-amino-(2,4,6-cycloheptatrien-1-yl)methyl]penicillin and 1.2 ml. of triethylamine in 50 ml. of methylene chloride there is added 0.7 grams of n-butyl isocyanate and the mixture is stirred for 3 hours at room temperature. Water is added to the reaction mixture and the aqueous layer separated. The methylene chloride layer is extracted again with water and the combined aqueous extracts washed once with ethyl acetate. The aqueous layer is then layered with ethyl acetate and the mixture acidified with dilute phosphoric acid. The ethyl acetate layer is separated and the aqueous layer extracted twice more with ethyl acetate. The combined ethyl acetate extracts are washed with saturated sodium chloride solution, dried and concentrated to about 25 ml. The concentrated ethyl acetate solution of the penicillin is treated with a solution of potassium 2-ethylhexanoate in n-butanol. The crystalline precipitate of the potassium salt of [(3-n-butylureido)-(2,4,6-cycloheptatrien-1-yl)methyl]penicillin is collected by filtration and washed with ethyl acetate.

The free [(3-n-butylureido)-(2,4,6-cycloheptatrien-1-yl)methyl]penicillin is obtained by dissolving the potassium salt in a large volume of water and treating with an ion exchange resin such as Dowex-50 or IR-200 (in the acid form), filtering to remove the resin and lyophilizing the resulting solution.

EXAMPLE 9

[(3-Phenylureido)-(2,4,6-cycloheptatrien-1-yl)methyl]penicillin

Following the procedure of Example 8, but substituting an amount of phenyl isocyanate equivalent to the butyl isocyanate, there is obtained the desired [(3-phenylureido)-(2,4,6-cycloheptatrien-1-yl)methyl]penicillin.

EXAMPLE 10

[(3-acetylureido)-(2,4,6-cycloheptatrien-1-yl)methyl]penicillin

Following the procedure of Example 8, but substituting an amount of acetyl isocyanate equivalent to the n-butyl isocyanate, there is obtained the desired [(3-acetylureido)-(2,4,6-cycloheptatrien-1-yl)methyl]penicillin.

EXAMPLE 11

[(3-Benzoylureido)-(2,4,6-cycloheptatrien-1-yl)methyl]penicillin

Following the procedure of Example 8 but substituting an amount of benzoyl isocyanate equivalent to the n-butyl isocyanate there is obtained the desired [(3-benzoylureido)-(2,4,6-cycloheptatrien-1-yl)methyl]penicillin.

What is claimed is:

1. A compound of the formula

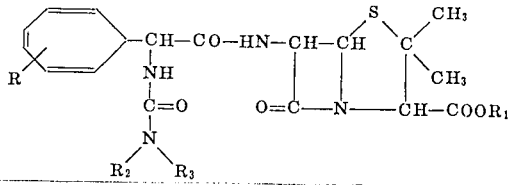

wherein R is hydrogen, halogen or lower alkyl; $R_1$ is hydrogen, lower alkyl, alkali metal, alkaline earth metal, dibenzylamine, or N,N-dibenzylethylenediamine; $R_2$ is hydrogen or lower alkyl; $R_3$ is hydrogen, lower alkyl, R-phenyl, R-naphthyl, or $R_4$-CO; $R_4$ is lower alkyl, R-phenyl or R-naphthyl; and acid addition salts thereof.

2. A compound of claim 1 wherein R, $R_1$, $R_2$ and $R_3$ each is hydrogen.

3. A compound of claim 1 wherein R, $R_2$ and $R_3$ each is hydrogen and $R_1$ is sodium.

4. A compound of claim 1 wherein R is methyl and $R_1$, $R_2$ and $R_3$ each is hydrogen.

5. A compound of claim 1 wherein R is chloro and $R_1$, $R_2$ and $R_3$ each is hydrogen.

6. A compound of claim 1 wherein R, $R_1$ and $R_2$ each is hydrogen and $R_3$ is lower alkyl.

7. A compound of claim 1 wherein R, $R_1$ and $R_2$ each is hydrogen and $R_3$ is butyl.

8. A compound of claim 1 wherein R, $R_1$ and $R_2$ each is hydrogen and $R_3$ is phenyl.

9. A compound of claim 1 wherein R, $R_1$ and $R_2$ each is hydrogen and $R_3$ is acetyl.

10. A compound of claim 1 wherein R and $R_1$ each is hydrogen and $R_2$ and $R_3$ each is lower alkyl.

11. A compound of claim 11 wherein each lower alkyl group is methyl.

12. A compound of claim 1 wherein R, $R_1$ and $R_2$ each is hydrogen and $R_3$ is benzyl.

* * * * *